(12) United States Patent  (10) Patent No.: US 8,382,046 B2
Holland, Jr. et al.  (45) Date of Patent: Feb. 26, 2013

(54) RISER LOCK UNIT FOR SPRINKLERS

(76) Inventors: Wayne H. Holland, Jr., North Hollywood, CA (US); Remo Ambrosini, Burbank, CA (US)

( * ) Notice: Subject to any disclaimer, the term of this patent is extended or adjusted under 35 U.S.C. 154(b) by 312 days.

(21) Appl. No.: 12/791,622

(22) Filed: Jun. 1, 2010

(65) Prior Publication Data

US 2010/0314506 A1 Dec. 16, 2010

Related U.S. Application Data

(60) Provisional application No. 61/185,684, filed on Jun. 10, 2009.

(51) Int. Cl.
*F16L 3/00* (2006.01)
*F16L 3/08* (2006.01)
*B05B 15/10* (2006.01)
*B05B 15/06* (2006.01)

(52) U.S. Cl. ............. 248/73; 248/65; 239/204; 239/283

(58) Field of Classification Search .......... 239/203–206, 239/273, 280–283, 19, 275–279; 248/300, 248/110, 113, 49, 68.1, 56, 57, 65, 73, 72, 248/231.51, 67.7, 75; 169/16
See application file for complete search history.

(56) References Cited

U.S. PATENT DOCUMENTS

| | | | | |
|---|---|---|---|---|
| 2,028,694 A * | 1/1936 | Spinks | ............................ | 211/65 |
| 2,616,647 A * | 11/1952 | Murchison | .................... | 248/110 |
| 3,544,049 A * | 12/1970 | Franklin et al. | .............. | 248/68.1 |
| D265,508 S * | 7/1982 | Rusteberg | ..................... | D24/128 |
| D276,212 S * | 11/1984 | Villanueva | ..................... | D8/373 |
| 5,170,976 A * | 12/1992 | Lundman | ..................... | 248/300 |
| 5,944,293 A * | 8/1999 | Loy | ........................... | 248/220.21 |
| 6,050,035 A * | 4/2000 | Thompson et al. | .......... | 52/167.1 |
| 6,247,274 B1 * | 6/2001 | Thompson et al. | .......... | 52/167.1 |
| 6,409,223 B1 * | 6/2002 | Bartholoma | .................. | 285/114 |
| 6,575,380 B2 * | 6/2003 | Corbett | .............................. | 239/1 |
| 6,912,959 B2 * | 7/2005 | Kolody et al. | .................. | 108/28 |
| 7,066,404 B1 * | 6/2006 | Kollar | ............................ | 239/288 |
| 7,455,278 B2 * | 11/2008 | Hsu | ................. | 248/675 |
| 8,083,188 B2 * | 12/2011 | Kittle et al. | ................. | 248/74.2 |

* cited by examiner

*Primary Examiner* — Jonathan Liu
*Assistant Examiner* — Erin W Smith
(74) *Attorney, Agent, or Firm* — Kelly & Kelley, LLP

(57) ABSTRACT

A riser lock unit is provided for quick and easy mounting onto an elevated sprinkler riser. The riser lock unit functions to retain or maintain the sprinkler riser in an elevated position, without normal spring-loaded retraction into an underlying sprinkler housing, to facilitate service and/or replacement of a sprinkler nozzle head mounted at the upper end of the riser. When desired, the riser lock unit is quickly and easily removed from the sprinkler riser.

17 Claims, 3 Drawing Sheets

RISER LOCK UNIT FOR SPRINKLERS

BACKGROUND OF THE INVENTION

This invention relates generally to a relatively simple and easy-to-use riser lock unit for installation onto an elevated riser of a pop-up type irrigation sprinkler to retain the riser in the elevated position during service and/or replacement of a spray nozzle mounted thereon. Following appropriate nozzle reinstallation onto the riser, the lock unit is quickly and easily removed from the riser to permit normal spring-loaded retraction into an underlying sprinkler housing.

Pop-up type irrigation sprinklers are well known in the art, wherein a sprinkler housing is adapted for connection to an irrigation water supply. When the water supply is turned on, water under pressure flows into and through the sprinkler housing, and further upwardly through a tubular pop-up riser to a spray nozzle mounted at the riser upper end. The water pressure causes the riser to move against a retraction spring from a normal retracted position concealed substantially within the sprinkler housing to an elevated position projecting upwardly from the sprinkler housing. In this elevated position, the spray nozzle is disposed generally above surrounding vegetation and the like and functions to distribute the irrigation water over a surrounding terrain area with a selected spray pattern. When the water supply is subsequently turned off, the retraction spring returns the riser back to the normal retracted position disposed substantially within the sprinkler housing.

In normal operation, the spray nozzle mounted at the upper end of the riser may require periodic cleaning to remove undesired grit or other particulate obstructions which have become trapped therein, resulting in interference with or obstruction of the desired pattern of irrigation water spray discharged therefrom. Alternately, it may be necessary or desirable to replace an existing spray nozzle with an alternate spray nozzle designed to discharge irrigation water with a different spray pattern. In either case, it has been necessary for service personnel to manually grasp a low profile flange at the top of the spray nozzle exposed generally at the top of the sprinkler housing, when the water supply is turned off, and to manually lift and hold the riser against the retraction spring downforce, while simultaneously removing and/or replacing the spray nozzle. Such manipulation of the riser and spray nozzle can be quite difficult. Moreover, cleaning of a removed spray nozzle normally requires both hands, whereby the riser must be released during such procedure, and then regrasped and pulled back toward the elevated position before remounting a cleaned spray nozzle thereon.

There exists, therefore, a significant need for a simple and easy-to-use riser lock unit or fixture for mounting onto an elevated riser of a irrigation sprinkler, for mechanically retaining and maintaining the riser in the elevated position to permit quick and easy access to a riser-mounted spray nozzle for suitable maintenance and/or replacement. The present invention fulfills these needs and provides further related advantages.

SUMMARY OF THE INVENTION

In accordance with the invention, a riser lock unit is provided for quick and easy mounting onto an elevated sprinkler riser. The riser lock unit functions to retain or maintain the sprinkler riser in an elevated position, without normal spring-loaded retraction into an underlying sprinkler housing, to facilitate service and/or replacement of a sprinkler nozzle head or spray nozzle mounted at the upper end of the riser. When desired, the riser lock unit is quickly and easily removed from the sprinkler riser, thereby permitting normal spring-loaded retraction of the riser substantially into the underlying sprinkler housing.

In the preferred form, the riser lock unit comprises a generally L-shaped base member including an open-sided lower plate defining a pair of laterally extending spaced-apart plate legs. This lower plate is joined integrally to an upright support or backing plate having a horizontally elongated slot formed therein. An open-sided upper plate also defines a pair of laterally extending spaced-apart plate legs, wherein the lower and upper plates are open at a laterally common side edge thereof. This upper plate extends from the plate legs rearwardly through the slot formed in the upright support plate of the L-shaped base member, before being joined to a relatively short down-turned flange. A raised protrusion, such as a bump or the like, is formed on the upper plate near the front margin of the slot and cooperates with the down-turned flange to retain the upper plate in assembled relation with the base member.

In use, the riser lock unit is adapted for quick and easy installation onto an elevated riser of an irrigation sprinkler, typically when the sprinkler is operating to deliver irrigation water through a nozzle head mounted at an upper end of the riser to surrounding vegetation. The riser lock unit is placed onto the elevated riser, with the riser extending between the spaced-apart legs of the upper and lower plates. During such placement of the riser lock unit, the down-turned flange on the upper plate is manually pressed against an outboard surface of the upright support plate to orient the upper plate substantially in parallel with the lower plate. In this configuration, the open-sided plates define a vertical column for facilitated reception of the elevated riser. When the riser lock unit is thus installed, the down-turned flange is released to permit the upper plate to pivot downwardly relative to the slot until inboard edges of the upper plate legs contact or engage the outer diameter surface of the elevated riser.

Thereafter, when the sprinkler water supply is turned off, the riser attempts to return downwardly by spring-assist toward a normal retracted position within an underlying sprinkler housing. However, such attempted retraction of the riser causes the riser to bind against the inboard edges of the upper plate legs, whereby the upper plate retains and maintains the riser in an at least partially elevated position despite turning off of the sprinkler water supply.

In this retained elevated position and with the sprinkler water supply turned off, the spray nozzle at the upper end of the riser is easily accessed for service, repair, and/or replacement. That is, the spray nozzle is easily removed as by rotational unthreading from the riser for suitable service and/or replacement, followed by easy re-mounting as by rotational threading onto the riser. After appropriate nozzle head service and/or replacement, the riser lock unit is easily removed from the riser, as by manually depressing the down-turned flange on the upper plate for permitting spring-assisted riser retraction into the underlying sprinkler housing.

The riser lock unit can be constructed from any suitable material, such as stainless steel, or molded plastic, or the like.

Other features and advantages of the present invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
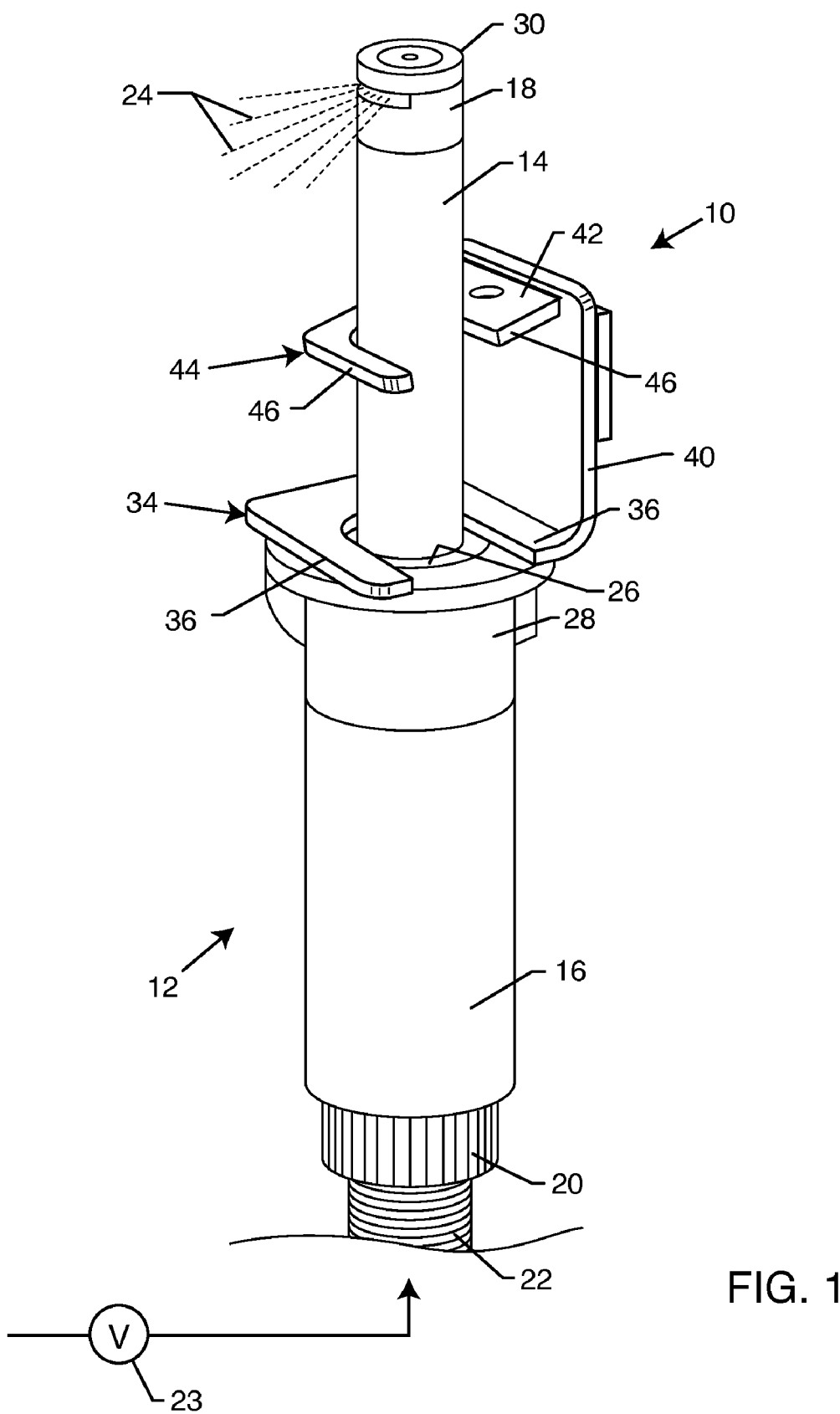
FIG. 1 is a fragmented perspective view showing a riser lock unit in accordance with the invention mounted onto an elevated riser of a pop-up irrigation sprinkler.
Figure 2:
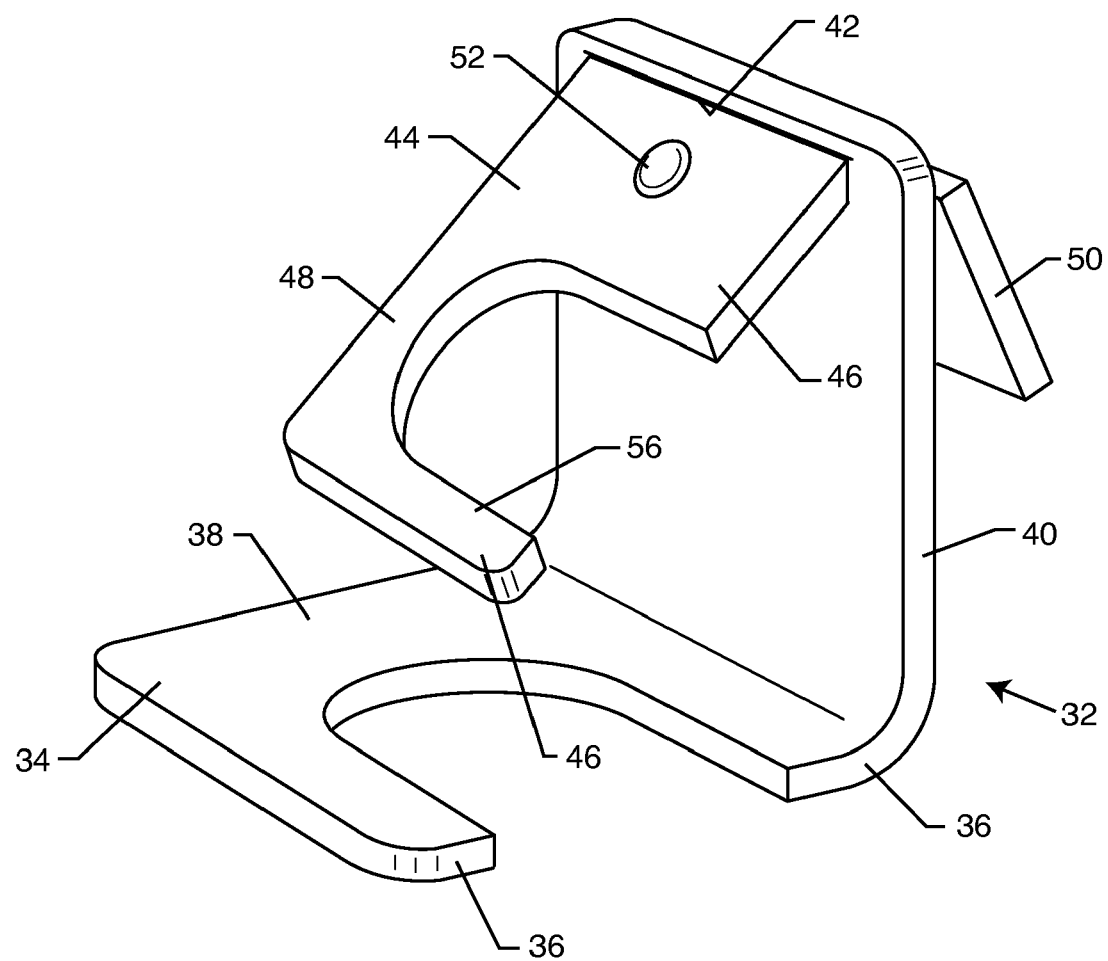
FIG. 2 is an enlarged perspective view of the riser lock unit.
Figure 3:
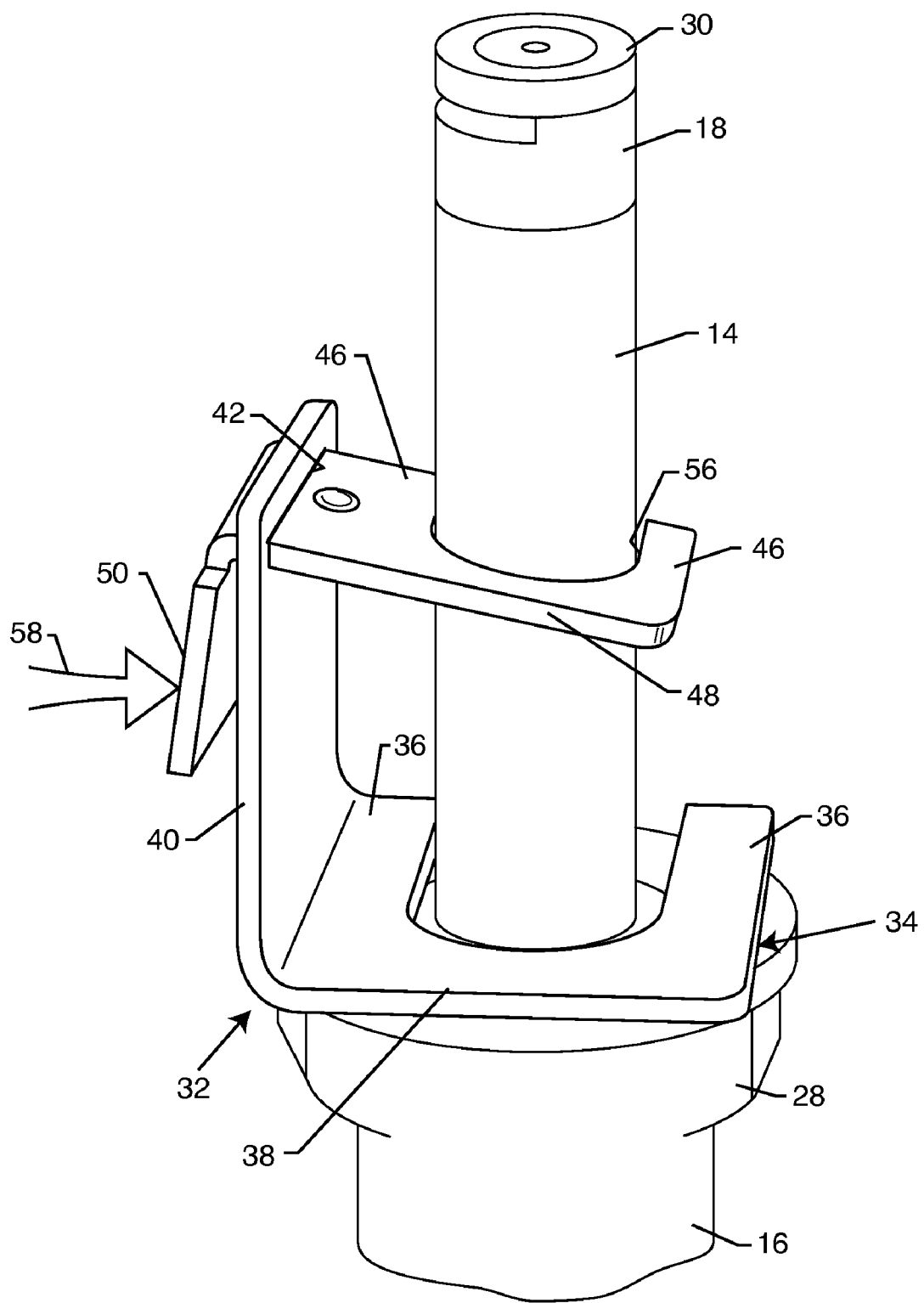
FIG. 3 is an enlarged and fragmented perspective view showing the riser lock unit installed onto the sprinkler riser, and depicting service and/or replacement of a riser spray nozzle.

As shown in the exemplary drawings, a riser lock unit or fixture referred to generally by the reference numeral 10 in FIGS. 1-3 is provided for use with a pop-up type irrigation sprinkler 12 to releasibly retain and maintain a tubular riser 14 is an elevated position with respect to an underlying sprinkler housing 16. In this elevated position (as viewed in FIGS. 1 and 3), a spray nozzle or spray head 18 is easily accessed for appropriate removal from the riser 14 for service and/or replacement, followed by similarly quick and easy replacement onto the riser 14. The riser lock unit 10 is thereafter removed from the riser 14 for resumption of normal sprinkler operation.

The illustrative pop-up irrigation sprinkler 12 is known in the art to include a sprinkler body or housing 16 having a fitting 20 (FIG. 1) thereon for suitable connection to a source of irrigation water under pressure, as by means of a water supply conduit 22 and a sprinkler valve 23. During normal operation, when the water supply is turned on, water under pressure enters the sprinkler housing 16 and flows upwardly through the tubular riser 14 to the spray nozzle 18 mounted at the upper end of the riser 14. The water under pressure overcomes the normal downforce applied to the riser 14 by a retraction spring (not shown) mounted within the sprinkler housing 16, whereupon the riser 14 displaces upwardly to an elevated spraying position as shown in FIG. 1. In this elevated spraying position, the spray nozzle 18 is positioned in spaced relation above the sprinkler housing 16 for conveniently distributing the irrigation water 24 over a selected surrounding terrain area with a selected spray pattern. Full-circle and/or a variety of part-circle and/or strip-shaped spray patterns for different spray nozzles are known in the art.

When the water supply is turned off, the absence of significant water pressure within the sprinkler housing 16 permits the retraction spring (not shown) to move the riser 14 downwardly toward a normal retracted position (also not shown) concealed substantially within the sprinkler housing 16. In this regard, an upper side of the spray nozzle 18 is normally exposed substantially within a central aperture 26 formed in a housing cap 28. In a typical installation, the sprinkler housing 16 is partially buried so that the housing cap 28 is positioned substantially at ground level.

Periodic service of the spray nozzle 18 is often required to remove particulate debris which otherwise interferes with or obstructs the desired pattern of irrigation water discharged therefrom. Alternately, it is sometimes desirable to replace the spray nozzle 18 with a different nozzle having, e.g., a different spray pattern associated therewith. Such removal of the spray nozzle 18 for service and/or replacement has typically been performed while the water supply is turned off, i.e., when the spray nozzle 18 and riser 14 are in the normal retracted position. The spray nozzle 18 is manually grasped by fingertip grasping of a low profile flange 30 at the upper end thereof, and then pulled upwardly against the downforce applied by the retraction spring. Such manipulation of the spray nozzle 18 and riser 14 can be difficult.

The riser lock unit 10 of the present invention is adapted for quick and easy mounting onto the elevated riser 14, preferably while the sprinkler 12 is operating to distribute irrigation water over surrounding terrain. Thereafter, when the sprinkler 12 is turned off, the riser lock unit 10 retains and maintains the riser 14 in an at least partially elevated position (against the downforce applied by the retraction spring) to accommodate quick and easy access to the spray nozzle 18 for suitable service and/or replacement. When the spray nozzle 18 is suitably reinstalled onto the elevated riser 14, the riser lock unit 10 of the present invention is quickly and easily removed from the riser 14 for normal spring-loaded riser displacement to the retracted position.

As shown in FIG. 2, the riser lock unit 10 comprises an L-shaped base member 32 having a laterally open-sided lower plate 34 defined by a pair of fore-aft spaced apart lower legs 36. The lower legs 36 are spaced apart at one lateral side of the lower plate 34, and are joined at the opposite lateral side of the lower plate 34 by a base link 38. A rear margin of the lower plate 34 is joined generally at a right angle to an upwardly projecting upright support plate 40 having a horizontally elongated narrow slot 42 formed therein near an upper end thereof, wherein this narrow slot 42 extends generally in parallel with the rear margin and also with the lower plate legs 36.

The riser lock unit 10 further includes an open-sided upper plate 44 which is also defined a pair of laterally extending and fore-aft spaced-apart plate legs 46. As shown in FIG. 2, this upper plate 44 defines the plate legs 46 which are spaced apart at one lateral side thereof, and are jointed at their opposite lateral sides by a base link 48. Importantly, the upper plate 44 is laterally open at the same laterally open side as the underlying lower plate 34, with the respective pairs of legs 46, 36 extending generally in parallel in a direction parallel with the plane of the upright support plate 40. A rear margin of the upper plate 44 extends rearwardly through the narrow slot 42 formed in the upright support plate 40, and then turns downwardly to define a short down-turned flange 50. Retention means such as a small protrusion 52, i.e., a bump or the like, is formed on the upper plate 44 at the front side of the slot 42, preferably on the top side of the upper plate, whereby the protrusion 52 and the down-turned flange 50 cooperative with the elongated slot 42 to define a pivotal connection means for maintaining the upper plate 44 in assembled relation with the L-shaped base member 32.

In use, with the sprinkler riser 14 in the elevated position (FIG. 1), such as during normal sprinkler spray operation, the riser lock unit 10 is quickly and easily placed onto the elevated riser 14 by sliding the lock unit 10 laterally onto the riser 14 while depressing the down-turned flange 50 to retain the upper plate 44 in substantially parallel relation with an outboard side or outboard surface of the underlying lower upright support plate 40, thereby positioning the upper plate 44 sufficiently in parallel with the lower plate 34. Then, by manually releasing the lock unit 10, the upper plate 44 is allowed to fall or pivot downwardly about the slot 42 sufficiently for inboard edges 56 of the upper plate legs 46 (shown best in FIG. 2) to engage the outer diameter surface of the riser 14. Thereafter, when the sprinkler 12 is turned off, the internally mounted (and not shown) retraction spring will urge the riser 14 downwardly toward the retracted position. However, the inboard edges 56 of the upper plate legs 46 will bindingly engage the riser 14 to retain and maintain the riser 14 in an at least partially elevated position, notwithstanding the downforce applied by the retraction spring.

With the riser 14 retained in the elevated position, as viewed best in FIG. 3, the spray nozzle 18 at the upper end thereof is exposed for quick and easy access by service personnel. The spray nozzle 18 can be removed from the riser 14, as by rotational unthreading, for appropriate cleaning of particulate debris and the like from small internal nozzle passages. Alternately, if desired, a different spray nozzle which may have a different spray pattern associated therewith can be installed onto the upper end of the riser 14.

In either case, upon spray nozzle re-installation, the riser lock unit 10 of the present invention can be quickly and easily removed from the elevated riser 14 by simply depressing the down-turned flange 50 at the rear margin of the upper plate 44 in the direction of arrow 58 in FIG. 3. Such flange depression shifts the upper plate 44 back toward a position substantially or sufficiently in parallel with the underlying lower plate 34, with the inboard leg edges 56 releasing from the riser 14 to permit spring-assisted downward displacement of the riser and spray nozzle thereon to the normal retracted position. Accordingly, with the riser lock unit 10 removed, normal sprinkler operation may resume.

A variety of modifications and improvements in and to the riser lock unit 10 of the present invention will be apparent to those persons skilled in the art. By way of limited example, persons skilled in the art will recognize and appreciate that the riser lock unit 10 may be constructed from different materials, including but not limited to metal and plastic materials. Accordingly, no limitation on the invention is intended by way of the foregoing description and accompanying drawings, except as specifically set forth in the appended claims.

What is claimed is:

1. A riser lock unit, comprising:
   a generally L-shaped base member including a laterally open-sided lower plate defining a pair of generally parallel and laterally extending lower legs, said base member further including a generally upright support plate joined to a rear margin of and oriented generally perpendicular to said lower plate, said upright support plate having an elongated slot formed therein to extend generally in parallel with said rear margin;
   a laterally open-sided upper plate defining a pair of generally parallel and laterally extending upper legs spaced apart at one end common with said laterally open-sided lower plate, said upper plate defining a rear margin extending through said elongated slot formed in said upright support plate; and
   a flange coupled to said upper plate rear margin and oriented generally perpendicular to said upper plate;
   said flange being manually depressible against said upright support plate to orient said upper plate sufficiently in parallel with said lower plate to accommodate slide-fit mounting of said upper legs and said lower legs onto an elevated sprinkler riser projecting upwardly from a sprinkler housing, said flange being thereupon releasible to permit partial retraction of the elevated sprinkler riser whereby inboard edges of said upper legs bind against and mechanically retain the riser in an at least partially elevated position;
   said flange being manually depressible against said upright support plate for return orientation of said upper plate to a position sufficiently in parallel with said lower plate, whereby the riser is released from said upper legs and thereby permitted to return to a normal position retracted within the sprinkler housing.

2. The riser lock unit of claim 1 wherein said lower legs are spaced apart at one lateral end and interconnected at an opposite lateral end by a base link.

3. The riser lock unit of claim 1 wherein said upright support plate extends generally upwardly from said rear margin of said lower plate, and further wherein said elongated slot is formed in said upright support plate generally near an upper end thereof.

4. The riser lock unit of claim 3 wherein said flange coupled to said upper plate rear margin extends generally downwardly therefrom.

5. The riser lock unit of claim 4 further including retention means for maintaining said upper plate and flange in assembled relation with said base member.

6. The riser lock unit of claim 5 wherein said retention means comprises a protrusion formed on said upper plate at a location in front of said elongated slot formed in said upright support plate.

7. The riser lock unit of claim 6 wherein said protrusion is formed on an upper side of said upper plate.

8. The riser lock unit of claim 1 wherein said legs of said upper and lower plates extend generally in parallel with the plane of said upright support plate.

9. For use with an irrigation sprinkler having a sprinkler housing, and a riser having a spray nozzle mounted at an upper end thereof, said riser being movable between a normal position retracted within the sprinkler housing and an elevated spraying position extending upwardly from the sprinkler housing, a riser lock unit comprising:
   a generally L-shaped base member including a laterally open-sided lower plate defining a pair of generally parallel and laterally extending lower legs, said base member further including a generally upright support plate joined to a rear margin of and oriented generally perpendicular to said lower plate, wherein said upright support plate extends generally upwardly from said rear margin of said lower plate;
   a laterally open-sided upper plate defining a pair of generally parallel and laterally extending upper legs spaced apart at one end common with said laterally open-sided lower plate; and
   pivot means for pivotally interconnecting said upper plate with said upright support member, wherein pivot means comprises an elongated slot formed in said upright support plate near an upper margin thereof, said upper plate having a rear margin extending through said upper slot, and a flange coupled to said upper plate rear margin and extending generally downwardly therefrom;
   said pivot means being manually operable to orient said upper plate sufficiently in parallel with said lower plate to accommodate slide-fit mounting of said upper legs and said lower legs onto an elevated sprinkler riser projecting upwardly from the sprinkler housing, said pivot means being thereupon releasible to permit partial retraction of the elevated sprinkler riser whereby inboard edges of said upper legs bind against and mechanically retain the riser in an at least partially elevated position;
   said pivot means being manually operable for return orientation of said upper plate to a position sufficiently in parallel with said lower plate, whereby the riser is released from said upper legs and thereby permitted to return to the normal position retracted within the sprinkler housing.

10. The riser lock unit of claim 9 wherein said lower legs are spaced apart at one lateral end and interconnected at an opposite lateral end by a base link.

11. The riser lock unit of claim 9 further including retention means for maintaining said upper plate and flange in assembled relation with said base member.

12. The riser lock unit of claim 11 wherein said retention means comprises a protrusion formed on said upper plate at a location in front of said elongated slot formed in said upright support plate.

13. The riser lock unit of claim 12 wherein said protrusion is formed on an upper side of said upper plate.

14. The riser lock unit of claim 9 wherein said legs of said upper and lower plates extend generally in parallel with the plane of said upright support plate.

15. A riser lock unit, comprising:
- a generally L-shaped base member including a laterally open-sided lower plate defining a pair of generally parallel and laterally extending lower legs, said base member further including a generally upwardly projecting upright support plate joined to a rear margin of and oriented generally perpendicular to said lower plate, said upright support plate having an elongated slot formed therein to extend generally in parallel with said rear margin;
- a laterally open-sided upper plate defining a pair of generally parallel and laterally extending upper legs spaced apart at one end common with said laterally open-sided lower plate, said upper plate defining a rear margin extending through said elongated slot formed in said upright support plate;
- a down-turned flange coupled to said upper plate rear margin and oriented generally perpendicular to said upper plate; and
- retention means for maintaining said upper plate and flange in assembled relation with said base member;
- said flange being manually depressible against said upright support plate to orient said upper plate sufficiently in parallel with said lower plate to accommodate slide-fit mounting of said upper legs and said lower legs onto an elevated sprinkler riser projecting upwardly from a sprinkler housing, said flange being thereupon releasable to permit partial retraction of the elevated sprinkler riser whereby inboard edges of said upper legs bind against and mechanically retain the riser in an at least partially elevated position;
- said flange being manually depressible against said upright support plate for return orientation of said upper plate to a position sufficiently in parallel with said lower plate, whereby the riser is released from said upper legs and thereby permitted to return to a normal position retracted within the sprinkler housing.

16. The riser lock unit of claim 15 wherein said retention means comprises a protrusion formed on said upper plate at a location in front of said elongated slot formed in said upright support plate.

17. The riser lock unit of claim 16 wherein said protrusion is formed on an upper side of said upper plate.

* * * * *